United States Patent [19]
Bartlett et al.

[11] Patent Number: 6,163,610
[45] Date of Patent: Dec. 19, 2000

[54] TELEPHONIC HANDSET APPARATUS HAVING AN EARPIECE MONITOR AND REDUCED INTER-USER VARIABILITY

[75] Inventors: Charles Spurgeon Bartlett, Alexandria; Michael Anthony Zuniga, Fairfax, both of Va.

[73] Assignee: Lucent Technologies Inc., Murray Hill, N.J.

[21] Appl. No.: 09/055,481

[22] Filed: Apr. 6, 1998

[51] Int. Cl.$^7$ ...................................................... H04M 1/00
[52] U.S. Cl. .............................................................. 379/433
[58] Field of Search .................................. 379/433, 428; 381/386, 387

[56] References Cited

U.S. PATENT DOCUMENTS

| | | | |
|---|---|---|---|
| 5,343,523 | 8/1994 | Bartlett et al. | 379/430 |
| 5,491,747 | 2/1996 | Bartlett et al. | 379/433 |
| 5,909,490 | 6/1999 | Sokolich et al. | 379/433 |

*Primary Examiner*—Jack Chiang
*Attorney, Agent, or Firm*—Martin I. Finston

[57] ABSTRACT

A noise-cancelling handset has reduced inter-user variability. The handset includes an earpiece housing. A space, referred to as the "front volume" is defined by the rear and side walls of this housing and a front surface containing acoustic ports for radiation of received sound into the user's ear. An error microphone is situated so as to sample the acoustic field within the front volume. In use, a further volume, referred to as the "forward volume," is defined between the front surface and the user's outer auditory canal. A leaky acoustic seal typically obtains between the front surface and the user's auditory canal. Thus, the forward volume will effectively have an acoustic leak, which has a characteristic, but variable acoustic impedance that is mostly of inductive character. At least one acoustic port is provided to effectuate a controlled leak to the outside of the handset. The dimensions of the front volume and the controlled leakage port (or ports) are chosen such that the parallel combination of the acoustic impedances of the front volume and the controlled leak is less than the parallel combination of the acoustic impedances of the forward volume and its variable acoustic leak. As a consequence, variability between users (and between incidents of use by the same user) of the loudspeaker-error microphone response is reduced over an appropriate frequency range.

7 Claims, 4 Drawing Sheets

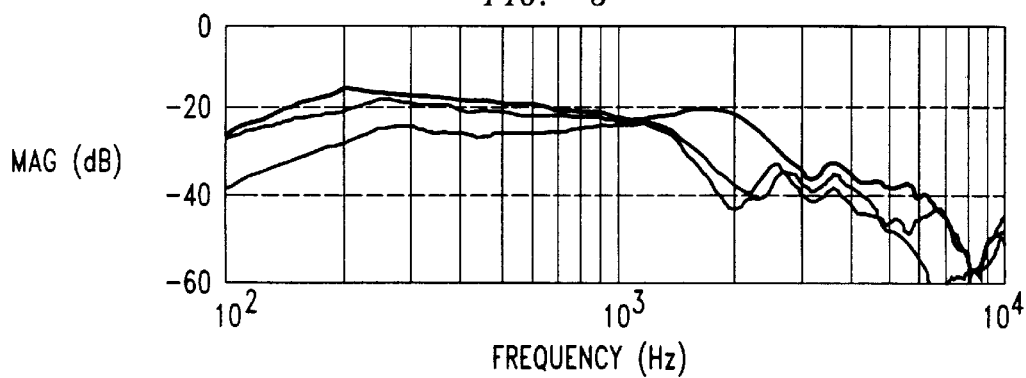
FIG. 5
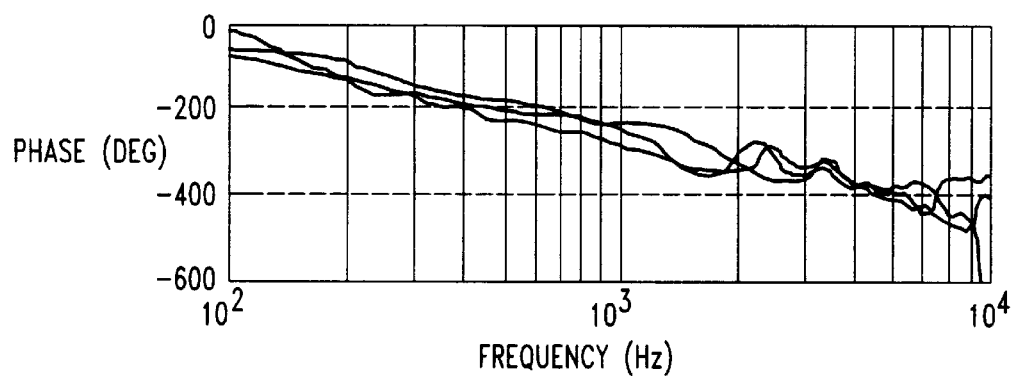
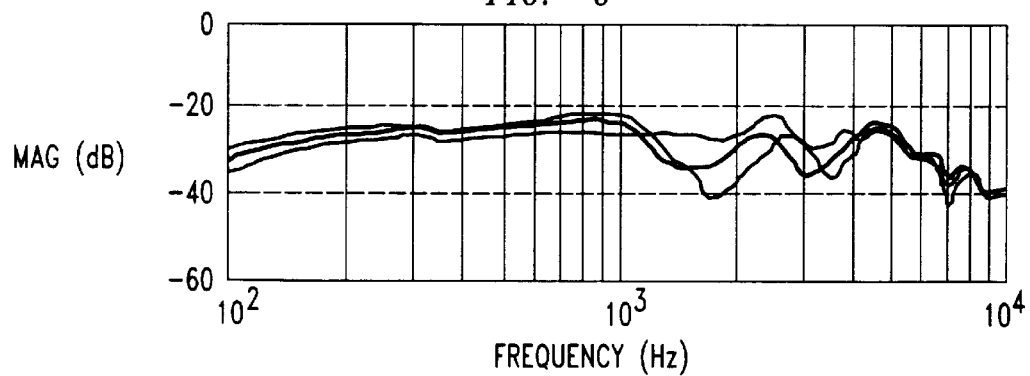
FIG. 6
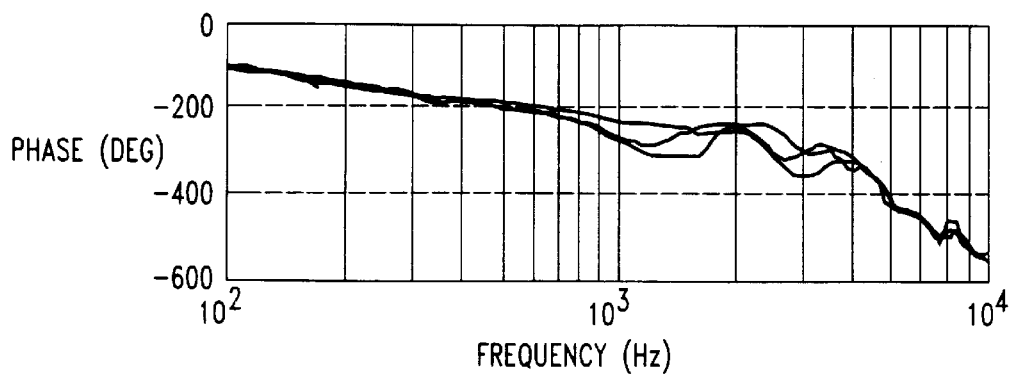

TELEPHONIC HANDSET APPARATUS HAVING AN EARPIECE MONITOR AND REDUCED INTER-USER VARIABILITY

FIELD OF THE INVENTION

This invention relates to communication handsets such as are used for wired and wireless telephonic communication. The invention relates more specifically to earpieces for handsets that include active noise canceling circuitry for reducing the energy of ambient noise that may interfere with the intelligibility of an incoming voice signal.

BACKGROUND OF THE INVENTION

A typical handset for, e.g., a conventional or cellular telephone, includes a handgrip connecting a receiver or earpiece at one end to a transmitter microphone situated at the other end. Although the earpiece is typically held at close proximity to the user's ear, the user's ear often receives enough of the ambient noise to reduce the intelligibility of the incoming voice signal. For this reason, the utility of a conventional handset often suffers in noisy environments such as airports, city streets, and the interiors of moving vehicles.

One expedient that has been applied to this problem is a volume control for the handset. In at least some instances, the volume control can be used to render incoming speech more intelligible by increasing the volume of the incoming speech signal relative to the ambient noise level. However, simply turning up the volume is not always a perfect, or even an adequate, solution to the problem. For example, the incoming voice signal itself may be so corrupted with noise that increasing the volume provides little or no advantage. As another example, the ambient noise may be so loud, especially if it is concentrated in a relatively narrow range of frequencies within the band most critical for speech intelligibility, that the volume cannot be turned up high enough to compete with it without inflicting pain on the user.

One method for reducing the corruption of a received signal by ambient noise is to apply active noise cancellation. A typical circuit for active noise cancellation creates an inverted version of the undesired noise signal. This inverted signal is then added to the incoming signal stream.

Although it is not typical, in the prior art, to employ active noise cancellation in telephone handsets, this technique has been used in headsets such as those used by the operators of aircraft. In a noise-canceling headset, the inverted signal is applied to the earpiece, where it subtractively interferes with the undesired noise signal within the user's ear. Headsets of this kind are described, for example, in U.S. Pat. No. 5,343,523, entitled "Telephone Headset Structure for Reducing Ambient Noise", commonly assigned herewith.

Numerous difficulties have beset earlier efforts to apply this noise-canceling to handsets, rather than headsets. In particular, a headset exerts firm control over the positioning of the earpiece relative to the user's ear, and it also effects a seal between the earpiece-ear system and the outside world. By contrast, a handset typically provides little or no such seal, and by virtue of its manipulation by a user, it experiences widely variable positioning of the earpiece relative to the user's ear. For these reasons, it is difficult in a handset to match the phase and amplitude of the inverted signal to the actual noise. Without a substantial amount of such matching, there will generally lack a useful degree of noise cancellation.

One approach to this problem is described in U.S. Pat. No. 5,491,747, entitled "Noise-Cancelling Telephone Handset," commonly assigned herewith. In the handset described there, the receiver loudspeaker is mounted in a receiver cap conformed with a domed, apertured element. The dome fits into a user's outer ear to aid in positioning the handset. Although such a handset is useful for achieving better noise cancellation, it may meet with resistance in some commercial markets because of practical constraints on how it can be held during use, and because some customers might object to its external appearance, which includes a protrusion on the outer face of the earpiece for containing the monitoring microphone.

Thus, until now, there has lacked a communication handset that can provide effective active noise cancellation, and thus improve the intelligibility of incoming voice signals, even when subjected to individual and user-to-user variations in the manner in which it is held during use.

SUMMARY OF THE INVENTION

We have invented such a handset. A handset made in accordance with our invention includes an earpiece having a housing made from an acoustically rigid material. A space, referred to as the "front volume" is defined by the rear and side walls of this housing and a front surface containing acoustic ports for radiation of received sound into the user's ear. The error microphone, which provides input for the noise-canceling circuitry, is situated so as to sample the acoustic field within the front volume.

In use, it is expected that a further volume, referred to as the "forward volume," is defined between the front surface and the user's outer auditory canal. Furthermore, it is expected that there will be a leaky acoustic seal between the front surface and the user's auditory canal. Thus, the forward volume will effectively have an acoustic leak, which has a characteristic, but variable acoustic impedance that is mostly of inductive character.

In accordance with the invention, at least one acoustic port is provided in the side walls of the housing to effectuate a controlled leak to the outside of the handset. The dimensions of the front volume and the controlled leakage port (or ports) are chosen such that the parallel combination of the acoustic impedances of the front volume and the controlled leak is less than the parallel combination of the acoustic impedances of the forward volume and its variable acoustic leak. As a consequence, variability between users (and between incidents of use by the same user) of the loudspeaker-error microphone response is reduced over an appropriate frequency range. This leads to more dependable noise cancellation.

BRIEF DESCRIPTION OF THE DRAWINGS

FIGS. 5 and 6 present plots of the loudspeaker-to-microphone phase and amplitude responses for respective noise-canceling earpieces. Responses for three distinct users are represented in these figures. The earpiece of FIG. 5 belongs to the prior art. The earpiece of FIG. 6 is an earpiece made according to the present invention.

DETAILED DESCRIPTION

Figure 1:
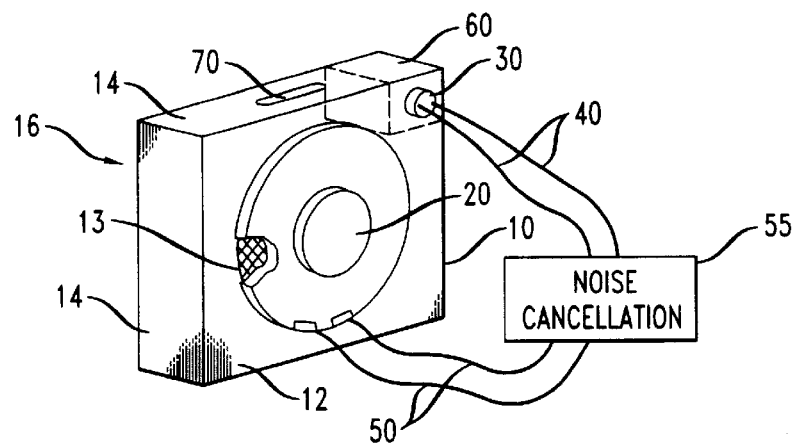
FIG. 1 is a partially schematic, perspective view of an earpiece assembly according to the invention in one embodiment.

The earpiece assembly shown in FIG. 1 includes housing 10, which is advantageously made from an acoustically rigid material such as polycarbonate, phenolic, or acrylic plastic or hard rubber. By "acoustically rigid" is meant that in thicknesses practical for the practice of the invention, these materials are capable of attenuating sound in the frequency range 200–3500 Hz by more than 25 dB. A concavity is formed by rear wall 12 and side walls 14 of the housing. The interior space 16 partially enclosed by this concavity is referred to hereinafter as the "front volume."

In the fully assembled handset, a front surface (not shown) completes the enclosure of front volume 16. This surface is typically the inner surface of an external wall of the handset. If housing 10 is provided as a partial enclosure, as shown, then the completing surface will typically be provided by the handset external housing. If housing 10 is provided as a full enclosure, then it will typically be assembled within the handset external housing in such a way that the completing surface sits flush within an aperture in the handset external housing and forms a continuous surface with it. In either case, the completing surface will be referred to herein as the "face plate" of the handset.

Loudspeaker 20 is advantageously mounted through an aperture in rear wall 12, such that loudspeaker diaphragm 13 will radiate sound into front volume 16. Error microphone 30 is also advantageously mounted through rear wall 12, so as to sample sound from the front volume. Sockets (not shown) are advantageously defined in the back of rear wall 12 for receiving the loudspeaker and error microphone. These sockets are desirably lined with a sealing material to form tight acoustic seals around the loudspeaker and error microphone. Seals useful in this regard may be formed, for example, by rubber grommets, or by appropriate adhesives.

Pairs of electrical leads 40 and 50 connect noise-cancellation circuitry 55 to, respectively, the error microphone and the loudspeaker. Within the noise-cancellation circuitry, an inverted version of a noise signal derived from the output of the error microphone is added to the signal driving loudspeaker 20. Noise-cancellation circuitry is described here for purposes of illustration. Circuitry defining other types of feedback paths may also be usefully employed with, and is intended to lie within the scope of, the invention.

It is advantageous to add acoustically lossy material 60, which is exemplarily felt or open-cell foam, to front volume 16. Such material is useful for damping undesirable resonant modes and reflections, and thus for smoothing the loudspeaker-to-microphone response. As shown in FIG. 1, the lossy material usefully takes the form of a pad placed in front of error microphone 30.

Error microphone 30 is preferably an electret microphone, because microphones of this kind offer advantages of small size, good sensitivity, and low delay.

A built-in acoustic leak 70 is provided from front volume 16 to the external environment. This leak is provided by one or more ports that penetrate one or more side walls of housing 10. This leak is desirably provided in a portion of housing 10 that is either continuous with the external housing of the handset, or that is juxtaposed to the external housing. If the external housing is juxtaposed, then a corresponding port should be provided in the external housing, so that there is a continuous passage from front volume 16 to the external environment. The significance of built-in leak 70 is discussed in detail below.

Figure 2:
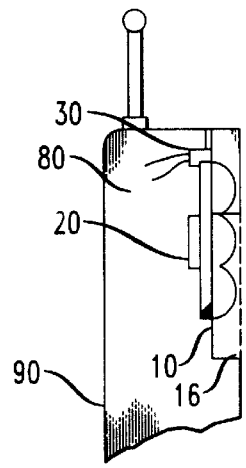
FIG. 2 is a partially schematic, sectional view of the earpiece assembly of FIG. 1 installed in a telephonic handset and positioned for use adjacent the ear of a human user.

As shown in FIG. 2, rear volume 80 is defined behind housing 10, within the interior of external housing 90 of the handset. Forward volume 100 is defined between faceplate 110 and the inner walls 120 of the user's outer auditory canal. Receiver acoustic ports 130 admit received sound from front volume 16 into forward volume 100. Because a perfect acoustic seal is rarely, if ever, formed between the earpiece and the user's ear, leak 132 will generally obtain between forward volume 100 and the external environment. Leak 132 will typically vary between users, and will even vary during a telephone call by a single user as the user changes his hold on the handset. For these reasons, leak 132 is referred to hereinbelow as the "variable" leak. Significantly, the size of forward volume 100 will also tend to vary between users and even when a single user changes his hold on the handset.

In noise-canceling earpieces of the prior art, the error microphone has been mounted within receiver ports defined in the front face of the earpiece, such that the error microphone senses the acoustic pressure in the user's ear-canal volume when the earpiece is in use. This is disadvantageous because it typically calls for a specially designed external housing for the handset. By contrast, our error microphone can be mounted within the handset housing. This permits the use of a standard housing design, with little or no modification. As a consequence, mass production and esthetic design are facilitated.

Figure 3:
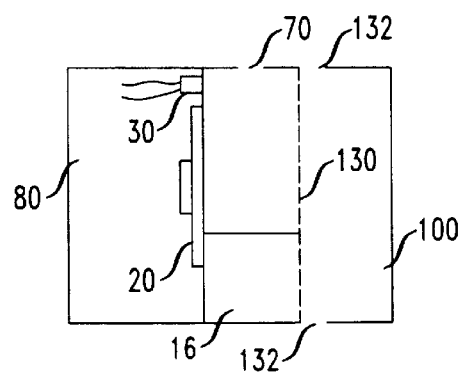
FIG. 3 is a schematic drawing of the earpiece assembly of FIG. 1, simplified for ease of illustration of a theoretical acoustic description thereof.

As noted above, the reliability of error-canceling communication devices of the prior art has suffered because of variations in leak 132 and volume 100. Our earpiece uses built-in leak 70 to reduce sensitivity to these variations, as we will now explain with reference to FIG. 3.

As is well known, the acoustic transparency of ports, such as receiver ports 130, depends upon the total surface area of the ports. As the combined surface area of ports 130 is increased, there will be a concomitant increase in the range of frequencies over which there is acoustic transparency between front volume 16 and forward volume 100. Thus, the port area can be chosen in such a way that over an operating range of frequencies, the acoustic behavior of the combined volumes 16 and 100 resembles that of a single chamber having their combined volume and communicating with the external environment via leak 132.

From basic acoustic theory, the smallest total area S of ports 130 that will provide acoustic transparency from subsonic frequencies up to a frequency $f_{max}$ is estimated by:

$$S \gg \frac{k_{max}^2 V_{ear}^2}{16},$$

where $$k_{max} = \frac{2\pi}{c} f_{max},$$

c is the velocity of sound in air, and $V_{ear}$ is the volume of the user's ear cavity. In many practical situations, the ambient noise will be concentrated in a frequency low enough that a sufficient value for $f_{max}$ is about 1000 Hz. With typical ear dimensions, this corresponds to a value for S (setting the left hand side of the equation approximately equal to ten times the right hand side) of about 0.4 cm².

Now let the acoustic inductances of the built-in leak and the variable leak be denoted $L_{b-i}$ and $L_{var}$ (t), respectively. The time variable is introduced in this notation to indicate variability, as discussed above. Similarly, let the acoustic capacitances of the front and forward volumes be denoted $C_{frt}$ and $C_{fwd}$ (t), respectively. Let ρ represent the density of air, let $V_{frt}$ represent the front volume, and let S represent the surface area of the built-in leak. Then $C_{frt}$ is approximately given by $V_{frt}/\rho c$, and $L_{b-i}$ is approximately given by $$\frac{\rho}{4\sqrt{S}}.$$

Since the acoustic impedances of the front and forward volumes are dominated by their capacitances and the acoustic impedances of the built-in and variable leaks are dominated by their inductances, the net admittance of the parallel combination of both volumes and both leaks is estimated as:

$$Y_{net} = j\omega C_{frt} + \left(\frac{1}{j\omega}\right)\left(\frac{1}{L_{b-i}}\right) + j\omega C_{fwd}(t) + \left(\frac{1}{j\omega}\right)\left(\frac{1}{L_{var}(t)}\right).$$

Variability is readily reduced by selecting a parallel combination of acoustic admittances for the front volume and the built-in leak that is greater than the parallel combination of admittances for the forward volume and the variable leak. Of course there will be a practical upper limit on the front volume, especially in the design of small cellular handsets. However, even a front volume as small as one or two cubic centimeters is effective when combined with a surface area for the built-in leak of, e.g., about 0.04–0.06 cm² or more.

Figure 4:
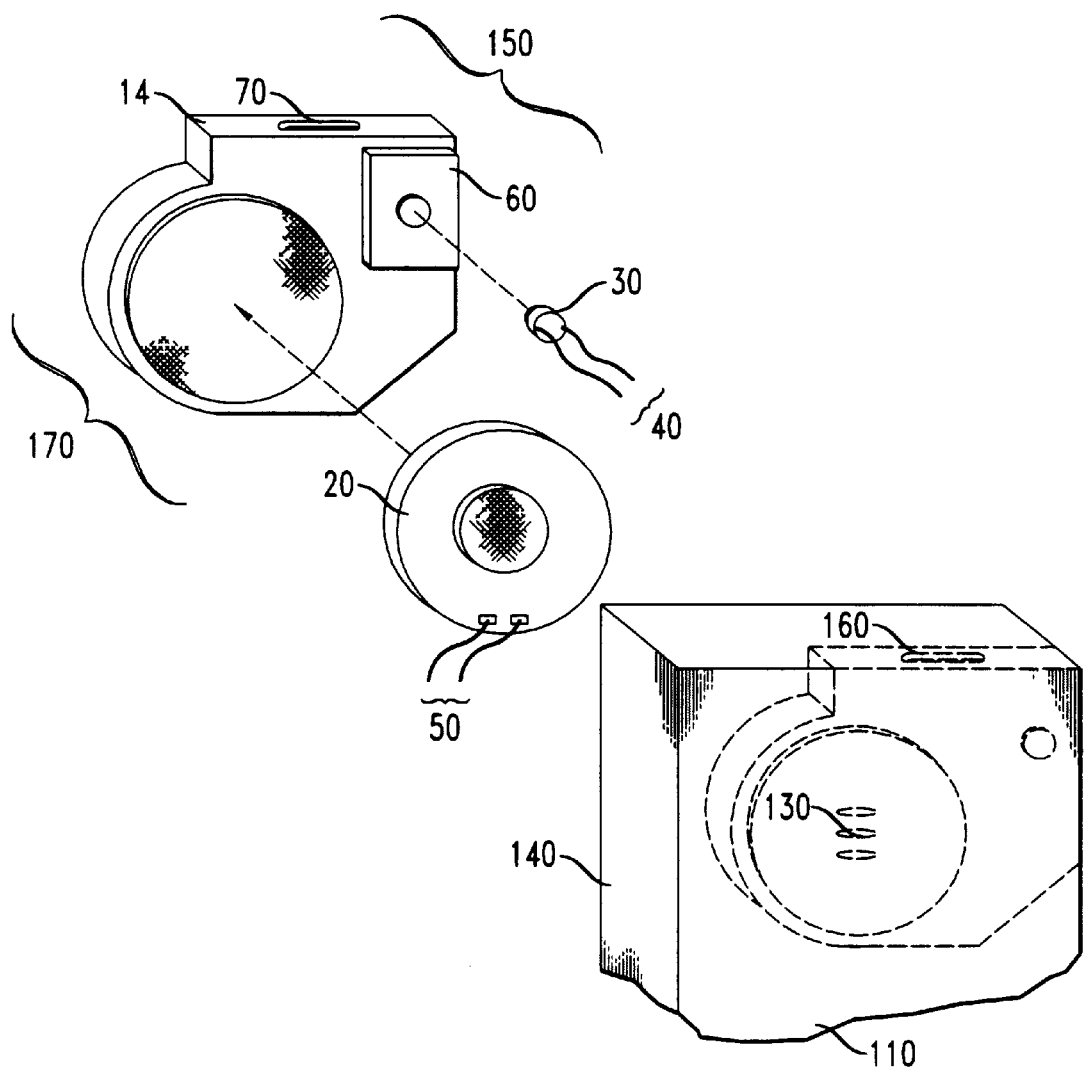
FIG. 4 is an exploded view of a portion of a compact cellular handset incorporating an illustrative embodiment of the inventive earpiece assembly.

FIG. 4 shows a practical configuration of our new earpiece assembly for incorporation in an exemplary compact digital handset. Reference numerals in FIG. 4 have the same meanings as in preceding figures. Faceplate 110 is provided as a portion of external handset housing 140, perforated by receiver acoustic ports 130. Corner portion 150 of the earpiece assembly is mounted flush against internal top and side walls of the external housing. Port 160 defined in the external housing communicates directly with corresponding port 70 in the sidewall of the earpiece housing to provide the built-in acoustic leak. Rounded portion 170 of the earpiece housing is concentric with loudspeaker 20.

As noted, the built-in acoustic leak represents an impedance in parallel with the variable acoustic leak. In order for such parallelism to obtain, the ports through which these respective leaks occur should not open into the same volume. More specifically, port 70, for the built-in leak, should not open into forward volume 100. In the embodiment illustrated, the desirable separation of the respective acoustic leaks is achieved by facing the respective ports in mutually perpendicular directions. More generally, it suffices for port 70 to open to the external atmosphere at a portion of the handset that, during normal operation, does not face into the user's ear canal.

Moreover, the error microphone does not need to be concentric or coaxial with the loudspeaker. It is necessary only that the error microphone sense acoustic pressure within front volume 16. Therefore, the manufacturer has great freedom in determining the placement of this microphone. In the embodiment illustrated in FIG. 1, for example, the error microphone is situated wholly to one side of the loudspeaker.

Numerous noise-cancelling circuits, useful for operation in conjunction with our handset and earpiece, are known to those skilled in the art, and they need not be described here in detail. One such circuit is described in U.S. patent application Ser. No. 08/493,017, entitled "Electronic Cancellation of Ambient Noise in Telephone Headset," commonly assigned herewith, hereby incorporated by reference.

EXAMPLE

Comparison between FIGS. 5 and 6 illustrates improvements in performance that may be attained by the present invention. Shown in FIG. 5 is the loudspeaker-to-microphone response of the noise-canceling earpiece described in U.S. Pat. No. 5,491,747, cited above. For each of three users, the upper graph shows the magnitude relationship, and the lower graph shows the phase-delay relationship, between the input driving voltage for the receiver loudspeaker and the output voltage of the error microphone. To produce these graphs, we had each of the three users hold a cellular telephone handset incorporating the prior-art noise-cancelling earpiece. Each user held the earpiece against his ear while we drove the loudspeaker with a white noise waveform. In each case, we measured the amplitude and phase response of the earpiece microphone relative to the (white noise) driving signal.

Shown in FIG. 6 is the loudspeaker-to-microphone response of an exemplary noise-canceling earpiece made according to the invention. The noise-canceling circuitry is essentially the same as that of the earpiece of FIG. 5. Three users participated in the same manner as in FIG. 5. A side-by-side comparison of these figures shows that our new earpiece responds with substantially less variability among the three users, particularly at frequencies below about 1 kHz.

Figure 7:
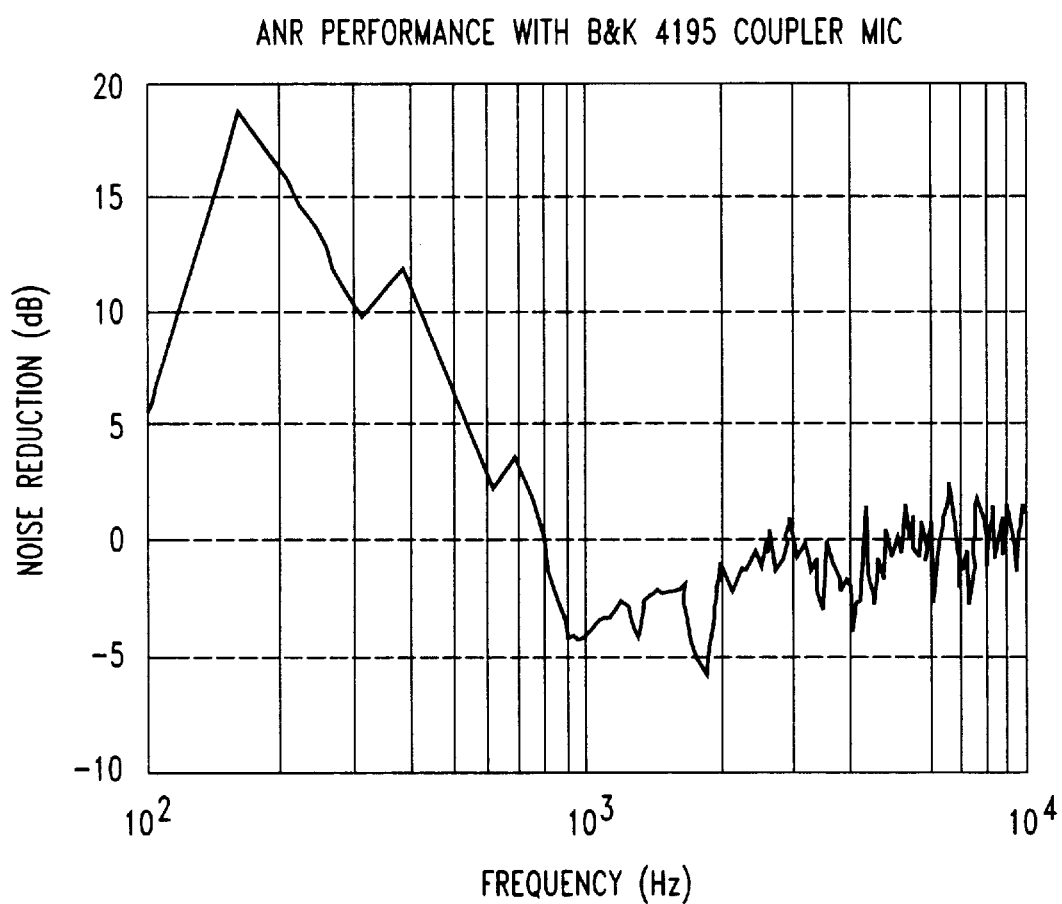
FIG. 7 is a plot of the amount of noise cancellation achieved, as a function of frequency, using the noise-cancelling earpiece of FIG. 6.

We used a B&K 4195 telephone test device to measure the amount of noise cancellation obtained using the inventive earpiece. As shown in FIG. 7, more than 10 decibels of noise reduction is obtained over a frequency range from about 120 Hz to about 420 Hz.

The invention claimed is:

1. A telephonic handset, comprising:

a) an earpiece housing at least partially enclosing a front volume;

b) a loudspeaker mounted so as to radiate sound into the front volume;

c) an error microphone mounted so as to sense acoustic pressure within the front volume;

d) an electronic circuit providing a feedback path from the error microphone to the loudspeaker; and e) at least one port that opens from the front volume to the atmosphere outside of the handset, said port defined in a portion of the handset that, during normal operation by a user, will not face into the user's ear canal.

2. Apparatus of claim 1, wherein the electronic circuit comprises noise-cancellation circuitry.

3. Apparatus of claim 1, wherein the loudspeaker and the error microphone are mounted in a common wall of the earpiece housing.

4. Apparatus of claim 1, wherein the loudspeaker and the error microphone are mounted non-concentrically.

5. Apparatus of claim 1, wherein the error microphone is mounted to one side of the loudspeaker.

6. Apparatus of claim 1, wherein the at least one port has a total surface area of at least 0.04 cm².

7. A method for operating a telephone handset having an earpiece housing and a front earpiece surface, the method comprising:

maintaining a temporary enclosure between the front earpiece surface and surfaces of a user's ear canal, said temporary enclosure having an acoustic leak to the external atmosphere via a first leakage path; and leaking acoustic radiation to the external atmosphere via a second leakage path provided by at least one port defined in the handset such that the second leakage path is parallel to the first leakage path, wherein:

the telephonic handset is a noise-canceling handset comprising a loudspeaker and an error microphone; and the second leakage path leads to the external atmosphere from an enclosure containing the loudspeaker and the error microphone.

* * * * *